(12) United States Patent
Klingspor et al.

(10) Patent No.: US 8,226,754 B2
(45) Date of Patent: Jul. 24, 2012

(54) LOW COST WET LIME/LIMESTONE/SODIUM FGD SYSTEM

(75) Inventors: Jonas Klingspor, Austin, TX (US); J. David Colley, Austin, TX (US); Greg N. Brown, Round Rock, TX (US)

(73) Assignee: URS Corporation, Austin, TX (US)

( * ) Notice: Subject to any disclaimer, the term of this patent is extended or adjusted under 35 U.S.C. 154(b) by 275 days.

(21) Appl. No.: 12/587,797

(22) Filed: Oct. 13, 2009

(65) Prior Publication Data

US 2010/0111777 A1    May 6, 2010

Related U.S. Application Data

(60) Provisional application No. 61/196,196, filed on Oct. 15, 2008.

(51) Int. Cl.
B01D 53/14 (2006.01)
B01D 47/06 (2006.01)

(52) U.S. Cl. .............. 96/234; 96/297; 96/300; 96/355; 96/366; 95/224; 95/235

(58) Field of Classification Search ............ 95/151, 95/200, 205, 224, 235, 196–197; 423/242.1, 423/243.01, 423.08, 243.08; 96/234, 236, 96/239–241, 296–297, 300, 322, 356–361, 96/366–370; 422/168

See application file for complete search history.

(56) References Cited

U.S. PATENT DOCUMENTS

| | | | |
|---|---|---|---|
| 3,775,532 A * | 11/1973 | Shah | 423/243.1 |
| 3,794,714 A | 2/1974 | Atsukawa et al. | |
| 3,904,742 A | 9/1975 | Akimoto | |
| 3,907,526 A | 9/1975 | Saleem et al. | |
| 3,948,608 A | 4/1976 | Weir, Jr. | |
| 4,039,307 A | 8/1977 | Bondor | |
| 4,049,399 A | 9/1977 | Teller | |
| 4,053,292 A * | 10/1977 | Schneider et al. | 96/245 |
| 4,102,982 A | 7/1978 | Weir, Jr. | |
| 4,140,501 A * | 2/1979 | Ekman | 96/232 |
| 4,222,993 A | 9/1980 | Holter et al. | |
| 4,269,812 A * | 5/1981 | Edwards et al. | 423/243.09 |
| 4,301,652 A | 11/1981 | Sohda et al. | |
| 4,343,771 A | 8/1982 | Edwards et al. | |
| 4,366,132 A | 12/1982 | Holter et al. | |
| 4,369,167 A | 1/1983 | Weir, Jr. | |
| 4,374,813 A | 2/1983 | Chen et al. | |
| 4,424,197 A | 1/1984 | Powell et al. | |
| 4,437,867 A | 3/1984 | Lerner | |
| 4,478,810 A | 10/1984 | Bloss et al. | |
| 4,627,970 A * | 12/1986 | Kruger | 423/555 |

(Continued)

FOREIGN PATENT DOCUMENTS

WO    WO93/01125    1/1993

*Primary Examiner* — Duane Smith
*Assistant Examiner* — Ives Wu
(74) *Attorney, Agent, or Firm* — DuBois, Bryant & Campbell, LLP.; William D. Wiese

(57) ABSTRACT

An FGD system is provided which can be retrofitted on existing utility coal-fired boilers. The design is based on a horizontal co-current scrubber capable of generating a pressure rise across the absorber. Modifications to existing plant equipment are minimized by the co-current horizontal scrubber design. The system includes features, which eliminate much equipment typically associated with other FGD designs, and reduces the use of support equipment such as tanks, agitators, and pumps. It also minimizes or eliminates the need for new buildings.

24 Claims, 7 Drawing Sheets

U.S. PATENT DOCUMENTS

| | | | | |
|---|---|---|---|---|
| 4,891,195 A | * | 1/1990 | Lin | 423/242.3 |
| 4,976,936 A | * | 12/1990 | Rathi et al. | 423/243.11 |
| 5,034,204 A | | 7/1991 | Moser et al. | |
| 5,084,255 A | * | 1/1992 | College et al. | 423/243.09 |
| 5,215,594 A | * | 6/1993 | Welp et al. | 134/22.1 |
| 5,403,568 A | * | 4/1995 | Stowe, Jr. | 423/243.08 |
| 5,648,048 A | * | 7/1997 | Kuroda et al. | 422/168 |
| 5,674,459 A | * | 10/1997 | Gohara et al. | 422/170 |
| 5,932,179 A | * | 8/1999 | Watanabe et al. | 422/177 |
| 6,471,073 B1 | * | 10/2002 | Okamoto et al. | 210/521 |
| 7,905,937 B2 | * | 3/2011 | Nieuwoudt | 55/444 |
| 2002/0110511 A1 | * | 8/2002 | Klingspor et al. | 423/243.08 |

* cited by examiner

LOW COST WET LIME/LIMESTONE/SODIUM FGD SYSTEM

RELATED APPLICATIONS

This application claims priority from U.S. Provisional Patent Application Ser. No. 61/196,196, filed Oct. 15, 2008.

FIELD OF INVENTION

This invention relates generally to flue gas desulfurization ("FGD") systems, and more specifically relates to a low cost wet lime/limestone/sodium FGD system, to control sulfur dioxide ($SO_2$) and other pollutants (e.g., hydrochloric acid, hydrofluoric acid, sulfuric acid, mercury, selenium, and other trace constituents) emitted from coal-fired boilers.

BACKGROUND OF INVENTION

Increasing awareness of the undesirable effects of industrially generated and emitted coal combustion products (flue gas), has led to a corresponding need to treat these gases so as to remove the pernicious components or convert them to harmless (and often useful) products. The industrial flue gases with which the present invention is especially concerned are those produced by coal-fired boilers as are commonly employed in electric utility installations. Among the relatively pernicious flue gases of concern produced by these boilers are sulfur dioxide ($SO_2$) and other pollutants (e.g., hydrochloric acid, hydrofluoric acid, sulfuric acid, mercury, selenium, and other trace constituents). These pollutants have for many years been removed from industrial flue gases by "scrubbing" the flue gas with lime/limestone slurries or the like, most commonly in some type of vessel in which the flue gas is contacted with a counter-current flowing stream of the mentioned slurry. Such methodology can and is used in the large newer boiler installations found in many utility operations. However there also exist in the electric utility industry a large number of older, coal-fired boilers, which presently include no flue gas scrubbers, and thus are urgently in need of some instrumentality to remedy their continuing polluting emissions. Typically an overall $SO_2$ removal efficiency of 80% to 99% is desirable, but the costs of installing or retrofitting equipment capable of such results has in the past been very high, and therefore has tended to discourage the purchase and installation of what otherwise would be most desirable enhancements. The present invention has as one of its key objects to provide a system which will remedy such reluctance by virtue of producing outstanding results at what are comparatively modest costs which may also extend the useful life of the older, boilers rather than retiring them as an alternative to retrofitting more expensive FGD systems.

SUMMARY OF INVENTION

In accordance with the present invention, an FGD system is provided which can be retrofitted on existing coal-fired boilers. The design is based on a horizontal co-current scrubber capable of generating a pressure rise across the absorber. Modifications to existing plant equipment are minimized by the co-current horizontal scrubber design. The pressure rise created by the co-current design reduces or eliminates the pressure drop introduced by the retrofit FGD system to minimize or eliminate modifications or upgrades to the existing boiler induced draft ("ID") or booster fans. The low profile of the horizontal scrubber reduces the costs associated with the new inlet duct from the ID fans to the absorbers and from the absorbers to the existing stack breech as well as associated structural steel and platforms. The compact equipment layout for the system allows it to be installed in plants where space is limited. The compact design also reduces the amount of structural steel required for the system and allows the system to be constructed in less time than conventional wet lime/limestone/sodium FGD systems. If necessary, bypass reheat or other modifications to cost-effectively convert the existing chimney to wet operation can be provided to allow the existing chimney to be used with minimal chimney modifications.

The FGD system of the invention is capable of achieving an $SO_2$ removal efficiency of 80-99% (with bypass, up to 92% removal; with reheat or wet stack, up to 99% removal). The system is capable of achieving these removals with any of the following reagents: 1) Inhibited oxidation, magnesium-enhanced lime; 2) lime, or limestone, forced oxidized to produce gypsum; 3) lime or limestone natural oxidation to produce a disposable waste, or 4) sodium-based reagents. The system may include additives to enhance $SO_2$ removal (e.g., organic acids such as DBA, i.e. di-basic acid, or sodium formate), or to control scale formation (e.g., thiosulfate to inhibit oxidation).

Since a new FGD system installation may increase plume opacity in some cases, the system can be provided with features for $SO_3$ control. Other multi-pollutant controls can be added to the system if desired for specific applications such as Hg removal. In addition to the unique design features of the co-current horizontal scrubber, the system is designed to reduce costs during engineering, procurement, and construction phases of an installation project.

Principal unique features of the FGD system of the invention include the use of co-current spray headers to create flue gas pressure rise; high velocity nozzles relative to the flue gas velocity (e.g., double hollow cone nozzles to promote pressure rise and $SO_2$ removal); flue gas sneakage control; bulk entrainment separation; quench system; flow distribution control; single step dewatering without reclaim tank and bleed pumps; agitation (without a mechanical mixer in lime/limestone forced oxidation systems); reagent preparation with pre-ground limestone(if available), sump and a unique reagent blending system; and a single process island requiring no tanks and associated equipment and controls. The system is based on a modular absorber design, using the absorber as building wall, and integrated buildings, and integrated reheat (if required). Organic acids such as DBA or other additives may be used for enhanced $SO_2$ removal Standard modular absorber designs (e.g., 150, 250, 350 MW) and layouts can be quickly and easily applied to a wide range of boiler installations. The system eliminates equipment typically associated with other FGD designs by including: Supplying pre-ground limestone if available, hydrated lime or liquid sodium reagents to reduce reagent preparation equipment such as grinding or slaking systems; elimination of slurry storage tanks and pumps; elimination of reaction tank agitators by mixing the slurry with air spargers in lime/limestone forced oxidation systems; and provision of a single dewatering step (if required) to eliminate primary dewatering, filter feed tanks and pumps, reclaim tank and pumps, and associated electrical and instrumentation. The system minimizes byproduct conveyors and reduces the use of support equipment such as tanks, agitators, and pumps. It also minimizes or eliminates the need for new buildings.

BRIEF DESCRIPTION OF DRAWINGS

The invention is diagrammatically illustrated, by way of example of the most complex of the configurations for a limestone, force-oxidized system which includes all the features of the invention, in the drawings appended hereto, in which.

DESCRIPTION OF PREFERRED EMBODIMENT

Figure 1:
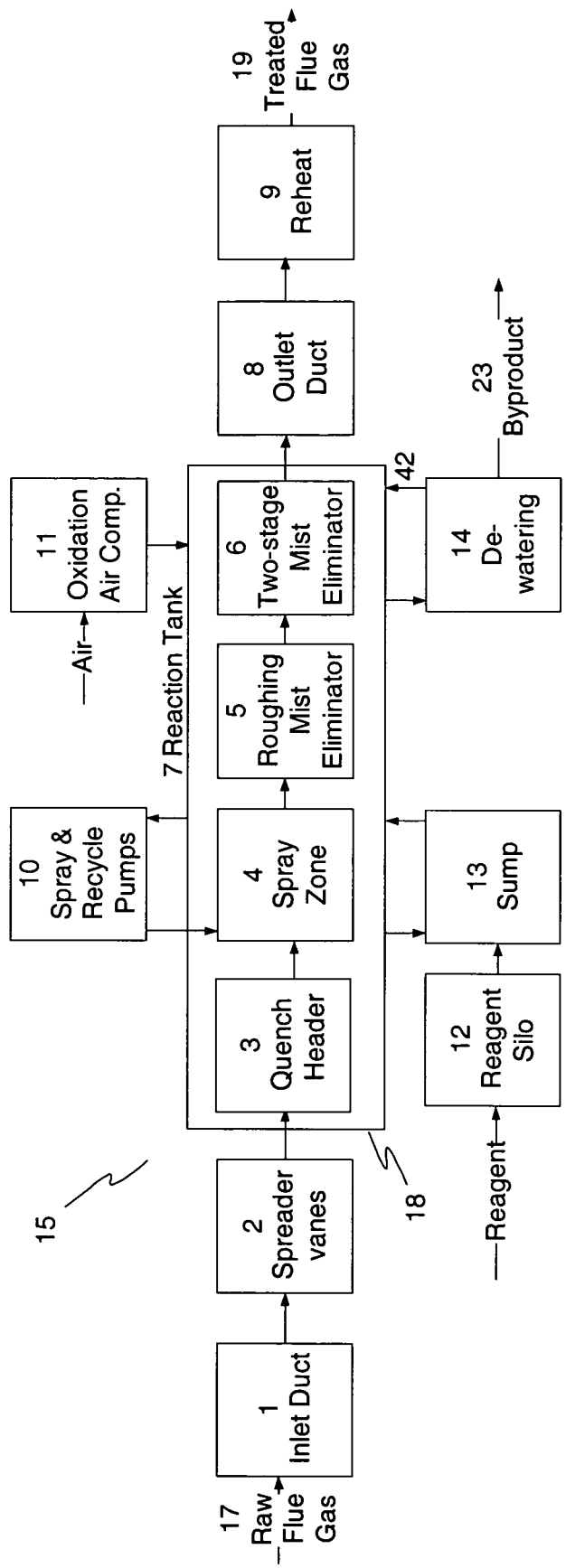
FIG. 1 is a schematic block diagram of an FGD system in accordance with the present invention.
Figure 2:
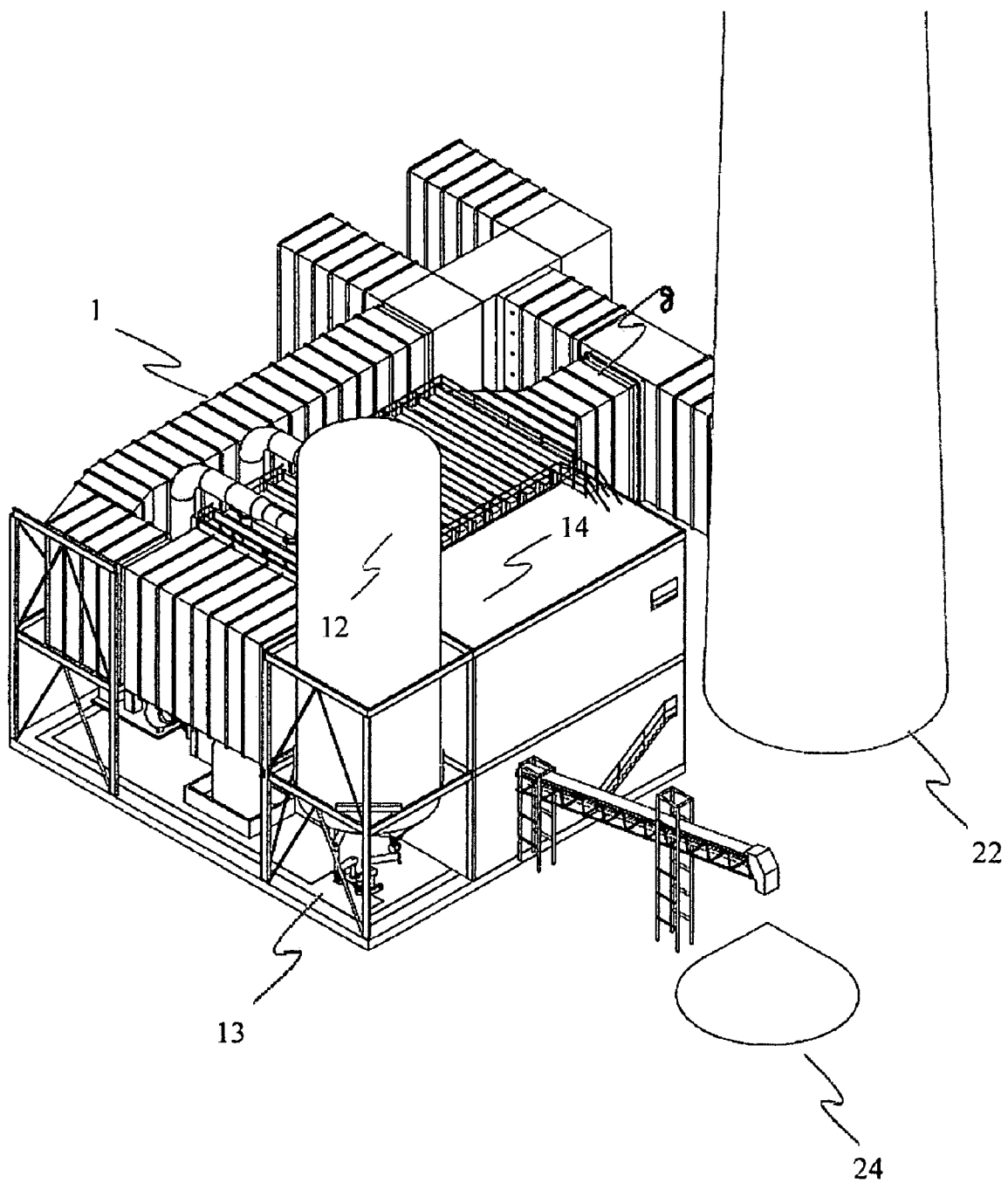
FIG. 2 is an external perspective view of the FIG. 1 system.

This description refers to a limestone force-oxidized system, which is the most complex configuration of the invention. Referring to FIG. 1, a simplified block diagram appears illustrating an FGD system 15 in accordance with the invention. FIGS. 2 through 9 can be considered simultaneously with FIG. 1 for a better understanding of the invention. The system 15 integrates on a single foundation or process island 16, numerous features to provide one compact, close-coupled, high-performance and cost-efficient design.

Raw flue gas 17 from a coal-fired boiler is provided to an inlet duct 1 which, in some applications, runs close-coupled to the absorber 18 (FIGS. 5 and 6) and the absorber outlet duct 8. Thereby, the inlet duct 1 can serve as the roof of the absorber spray and recycling pumps 10 and the oxidation air compressors 11, and the cost of the duct itself can be reduced. The inlet duct 1 is also in close proximity to the outlet duct 8, which facilitates regenerative reheat, if required. An alternative arrangement where a new stack is to be installed along with a new FGD system 15, is to bring the flue gas 17 directly into the inlet 1 of the absorber 18 and have it exit as treated gas 19 directly into the stack 22 with no turns of direction. By eliminating turns in the flue gas, the overall pressure drop can be kept to a minimum, helping eliminate the need for a new booster fan. Conventional vertical absorbers require two 90 degree turns in the flue gas, one at the inlet to the tower and one at its outlet, which cause increases in pressure drop. These turns are unavoidable, regardless of how the inlet and outlet ductwork are arranged. Gas flow distribution devices 2 such as spreader vanes and/or turner vanes, and for perforated plates are located in the inlet duct 1 to distribute the gas, side-to-side and top-to-bottom, such that the flue gas exhibits an even velocity profile as it enters into the spray zone 4 of absorber 18. As a result, recirculation zones are reduced and buildup in the absorber inlet duct is avoided.

Figure 5:
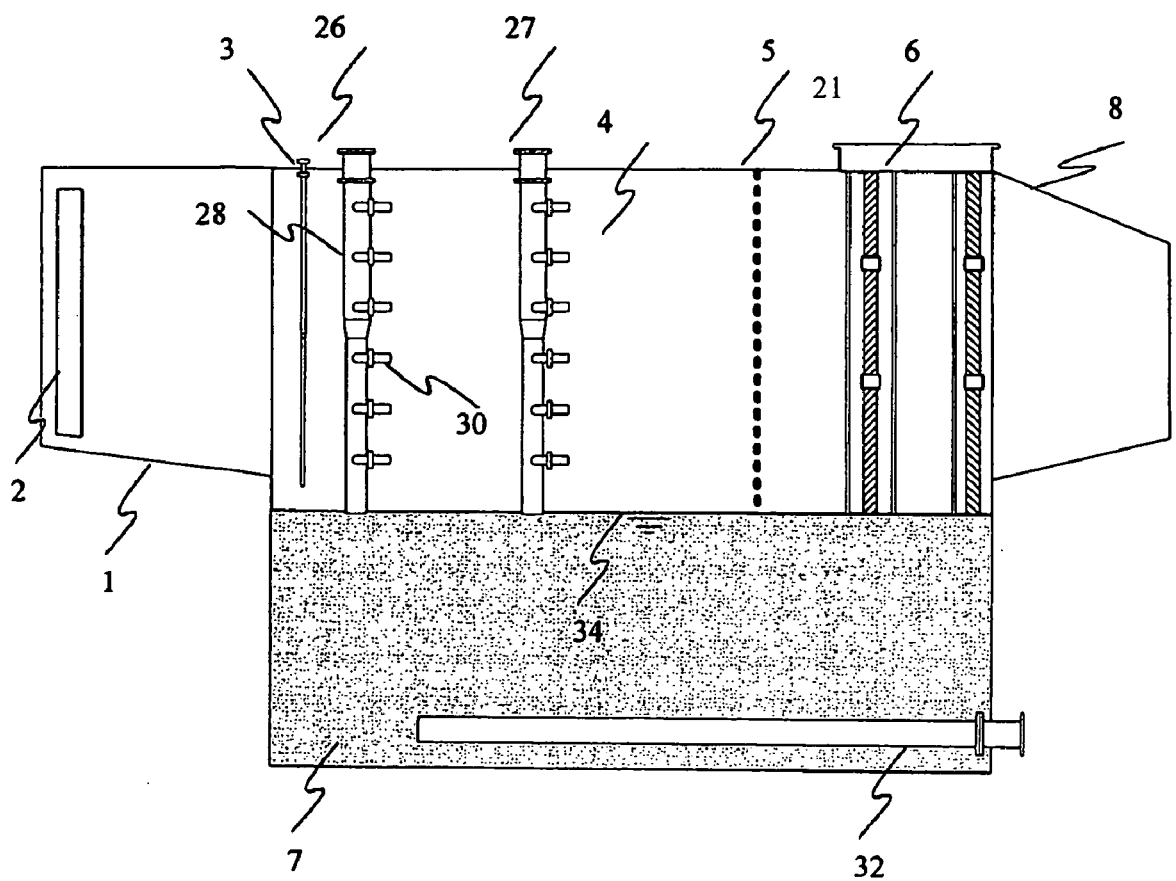
FIG. 5 is a schematic elevational view of the absorber portion of the system.
Figure 6:
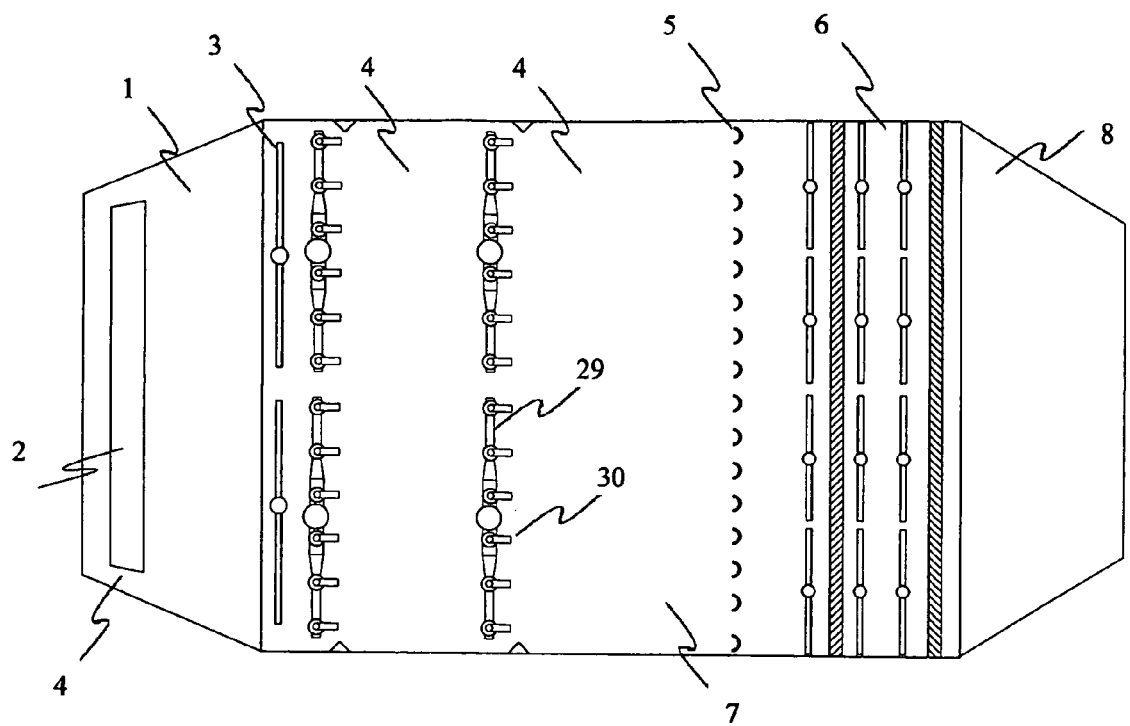
FIG. 6 is a schematic plan view of the absorber portion of the system.
Figure 7:
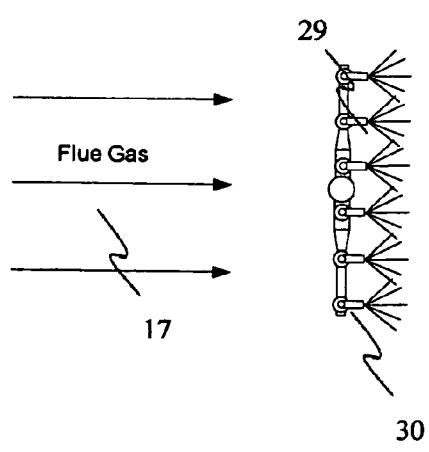
FIGS. 7 and 8 are, respectively, schematic plan and elevational views of portions of the spray nozzle assemblages used in the absorber of the FGD system.
Figure 8:
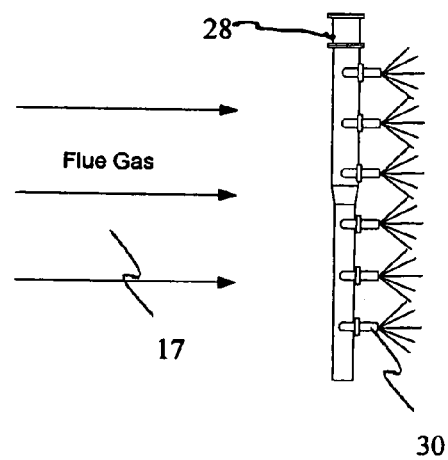
Figure 9:
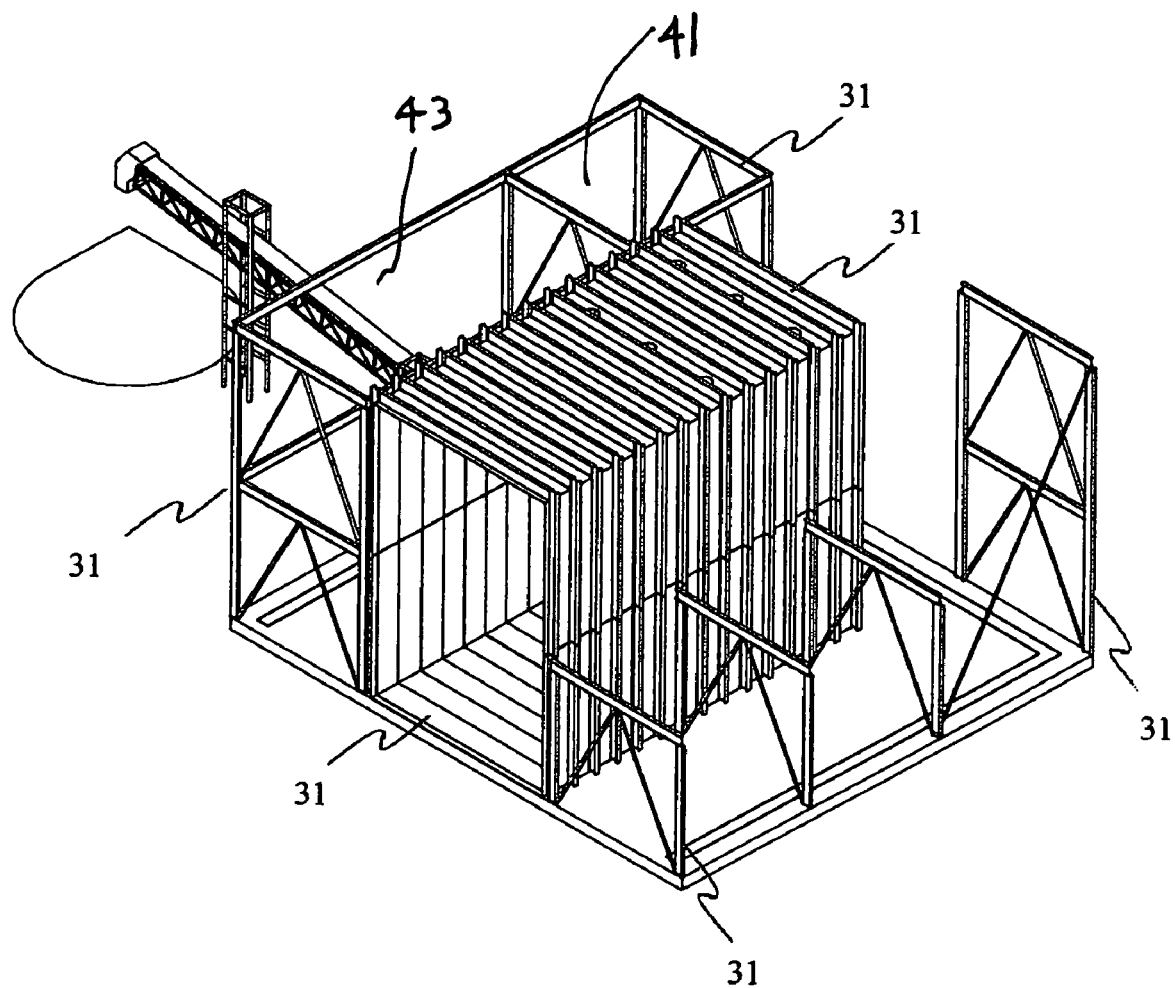
FIG. 9 is a perspective view of the structural steel and process island portions of the system, with other parts of the system removed for clarity.

The absorber 18 is a vessel, which includes reaction tank 7, which is integral to the absorber, and as readily seen in FIG. 5, is defined at the bottom of absorber 18, directly beneath spray zone 4 and mist eliminator space 21. The reaction tank 18 is filled with slurry, typically about 15 percent solids (more or less) in scrubber liquor. The slurry is used as a carrier for dry reagent to eliminate feed equipment. In the case of a limestone, force-oxidized system, the solids are predominantly gypsum with traces of limestone. The slurry is injected into the upper part of spray zone 4 by recycle pumps 10 that take suction from the reaction tank and inject the slurry into the upper part through the spray headers 26 and 27, via branches 27, 28, and nozzles 30. The number of spray headers can vary from two or more depending on the specific requirements of an installation to optimize $SO_2$ removal and pressure rise in the system. In lime/limestone forced oxidation systems, typically the recycle slurry (the upper level 34 of which is seen in FIG. 5) is agitated by the oxidation air from compressor 11 so that mechanical agitators are not required. Side mounted agitators may be used in lime or sodium-based systems or for limestone forced oxidation systems in lower sulfur applications, if there is insufficient oxidation air to allow for good agitation. Typically the reagent is lime, limestone, or sodium and forced oxidation to produce gypsum is employed for the limestone system. Additives such as adipic acid, DBA (from DBA system 25), and sodium formate can be used to enhance $SO_2$ removal performance. $SO_2$ removal can be optimized by using various reagents and additives known to be useful for this purpose.

Figure 3:
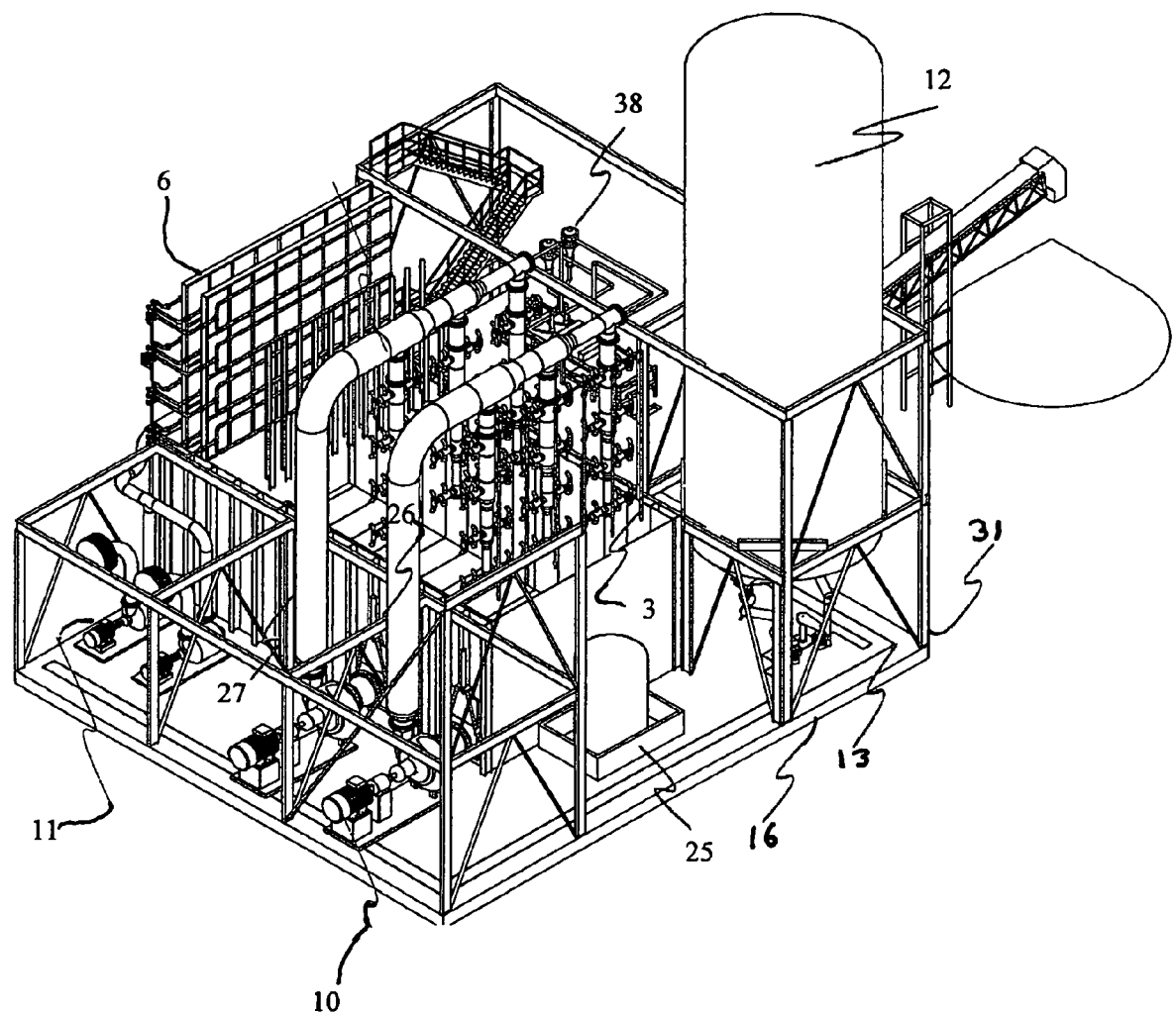
FIG. 3 is a perspective view taken from a viewpoint toward the upstream side of the FGD system, but with the inlet duct and most other portions outside the absorber removed to more clearly show the absorber details.
Figure 4:
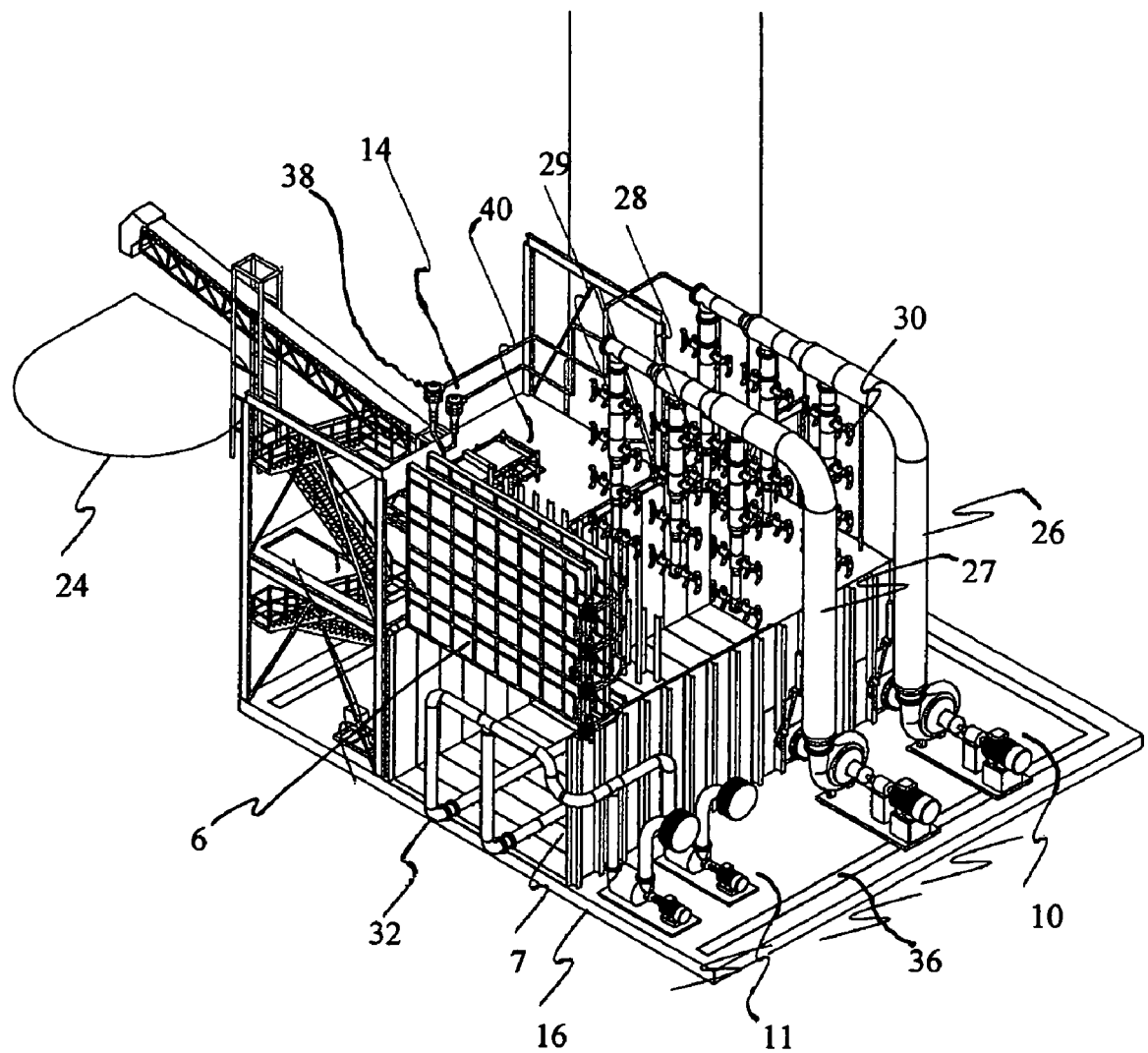
FIG. 4 is a further perspective view, similar in nature to FIG. 3, but taken from a viewpoint toward the downstream side of the absorber.

A single-stage quench header 3 is located ahead of the first main spray header 26 (FIGS. 3 and 4). The function of quench header 3 is to keep the spray header clean and reduce buildup of solids on the walls of the absorber at the wet/dry interface. The quench header 3 can operate with either reclaim water, service water, or a blend of reclaim and service water and can operate continuously or intermittently. It allows flexibility in selection of slurry header materials to reduce cost (e.g., lower alloy and/or FRP headers). The spray zone 4 is provided slurry from main spray headers 26 and 27. Additional spray headers can be added as necessary, based on performance requirements. These in turn feed vertical feed branches 28 and thence the multiple horizontal branches 29, which carry the nozzles 30 that introduce the recycle slurry in a co-current fashion (FIGS. 3,4,5, and 6). The number of headers, feed branches, and nozzles required depend on the size of the module and the performance required of the design for a specific installation.

Such a co-current arrangement generates an acceptable gas distribution profile in a horizontal arrangement throughout the absorber 18. The slurry is injected as a droplet spray at a velocity that is higher than the bulk flue gas velocity. In this way, a favorable environment for mass transfer and momentum transfer is created. A pressure rise is generated as opposed to a pressure drop typical of conventional scrubbers. The higher the required $SO_2$ removal efficiency of the design, the higher the pressure rise will be due to the need to introduce greater slurry flows into absorber 8 to boost $SO_2$ capture rates. In many cases, the scrubber system 15 will not require a booster fan to operate as the net pressure drop will be close to zero inches of water gauge. The nozzle design can use either full-cone or hollow-cone spray patterns but typically uses a spray angle between 60 and 120 degrees to maximize momentum transfer, with a typical angle being about 75 degrees. The preferred orientation for the nozzles is to have the axis of the conical spray approximately parallel to the gas flow. However, the spray angle is required to cover the entire cross sectional area of the absorber with slurry. Operating pressure of the nozzles is typically around 20 psig but can vary from 10 psig to 45 psig or more as required. The droplet exit velocity from the spray nozzles 30 is typically from 15 to 45 feet per second, or higher if required of the design for a specific installation.

Double hollow cone or full-cone nozzles work well. Such nozzles are available commercially from numerous sources such as Bete, Spraying Systems, Lechler, and others. The first main spray header 26 and its branches is made of alloy material when an intermittent quench is selected, and the subsequent main spray header(s) and its or their branches is or can be made of fiberglass reinforced plastic ("FRP") to further reduce system cost. If a continuous quench is used, all slurry headers and branches can be made of lower cost FRP if desired. Requirements for intermittent and continuous quench depend on water balance based on factors such as sulfur or chlorine content of coal. The spray nozzles 30 are typically made of abrasion resistant materials such as silicon carbide, but in clear liquor applications such as for sodium scrubbers, may be made of alloy. The ultimate design of the absorber spray zone 4 is based on $SO_2$ removal requirements and pressure drop requirements to avoid fan upgrades. Design parameters to optimize $SO_2$ removal and pressure drop include: (1) flue gas velocity in the spray zone 4; (2) spray nozzle design parameters such as nozzle pressure, spray angle, nozzle type (full cone, hollow cone, double down hollow cone), droplet velocity and droplet size; and (3) slurry pump design such as discharge pressure and flow rate to produce the optimum liquid-to-gas ratio (L/G) for $SO_2$ removal and pressure rise. Spray zone design and performance can be optimized by use of techniques such as CFD modeling and FGDPRISM (simulation program) modeling calibrated based on test results, operating data, and experience.

A bulk entrainment separator or roughing mist eliminator ("ME") 5 is present in the ME space 21 adjoining absorber 18 spray zone 4, typically around 10 ft (more or less) ahead of the conventional ME 6. The roughing ME 5 design is based on CFD modeling to reduce liquid loading and improve gas velocity profile at the ME face. The design is optimized based on CFD modeling and is designed to minimize pressure drop while achieving necessary removal of entrained liquid and straightening flow upstream of the conventional ME. The roughing ME may typically be fabricated from nominal 8 inch CPVC pipe cut in half lengthwise or other suitable devices. The device such as half pipes typically stretches from the reaction tank 7 liquid level 34 (FIG. 5) to or near the absorber roof. A second stage immediately behind the first stage and offset can be used to maximize efficiency, if required. Pressure drop is typically around a ¼ inch and typically the liquid loading at the face of conventional ME 6 is reduced by around 50 percent or more as needed. The roughing ME 5 also improves the gas velocity profile ahead of the conventional ME 6. The ME design is based on (1) CFD modeling and/or (2) physical modeling to optimize performance to minimize pressure drop and slurry carryover. If necessary a two stage mist eliminator 6 can successfully operate at velocities up to 20 feet per second provided that the drain boxes are located such that flooding of the vanes is avoided and that the mist eliminator vanes may typically employ a hook if needed and avoid connection hardware on the trailing edge that generate mist carryover.

If desired, the outlet duct 8 can be placed in close proximity to the absorber inlet duct 1, facilitating use of regenerative reheat, if needed. The outlet duct 8 is also at the same elevation as the inlet duct 1, making possible a very short duct run to the stack 22 leading to a lower installed cost. The outlet duct length is minimized compared to the inlet duct since the materials for the outlet duct are more expensive. In many cases the existing stack 22 can be used when the system 15 is installed to avoid the cost of a new stack. Several options are available to reuse the existing stack 22. One option is to reheat flue gas, which can be accomplished at reheat 9 with a small bypass of flue gas around the absorber, regenerative close-coupled reheat, or steam/hot water indirect reheat. The existing stack 22 can in many uses be operated wet by lining the stack flue to create a smooth surface and protect the integrity of the stack. Due to the high performance of the system 15, $SO_2$ removal efficiency above 90 percent is still possible with 5 to 6 percent flue gas bypass The spray and recycle pumps 10 (FIG. 4) can be dedicated to a single spray header or manifolded together to serve several spray headers. Using an elevated nozzle pressure (e.g., 20 psig or more) drop allows for recycle pump turndown in a manifold arrangement without jeopardizing the integrity of the nozzle spray pattern and provides good transfer of momentum from the slurry to the flue gas to reduce pressure drop. The elevation of the spray header nozzles 30 relative to the liquid height 34 in the reaction tank 7 is very low and the fact that the main slurry recycle stream does not have to be lifted above the inlet duct typical of conventional scrubbers allows the higher pressure drop at the nozzles 30 to be achieved without a resultant increase in pump and operating costs compared to conventional scrubbers.

In limestone forced oxidation systems, the oxidation air compressors 11 (one operating is shown, one spare is otherwise provided) serve dual purpose. First, oxidation air is introduced into the reaction tank 7 to convert the absorbed $SO_2$ to sulfate and thus produce a gypsum byproduct 23 (shown in FIG. 2 accumulating at gypsum stack 24), which also helps to minimize the chemical scaling inside the absorber. Second, the oxidation air is introduced through a sparge header 32 such that no additional agitation is required, thereby eliminating the need for dedicated agitators. The design and arrangement of the sparge header may vary for the invention depending on performance requirements for the system design.

Preground limestone, hydrated lime or sodium-based reagent can be used as reagent and stored in a silo 12 which may be close coupled to the absorber reaction tank 7 depending on site specific equipment arrangements. Two feed systems (one operating, one spare) feed the reagent to the sump 13. The structural steel 31 (FIGS. 1 and 9) used to support the absorber is used to support the reagent storage silo 12 if required and also provides supports for inlet duct 1, outlet duct 8, dewatering station 14, and structure to enclose equipment if needed in colder climates. The structural steel extends from the absorber out to the two bays 41 and 43, one on either side of the absorber. This external structural steel can effectively be used to absorb the lateral forces on the absorber walls. Having remote steel in this fashion is much more effective than reinforcing the absorber walls only and results in a reduction in steel quantity. By serving a dual purpose, the installed cost of the absorber is kept to a minimum.

The sump 13 is an underground pit typically made of concrete and lined e.g. with ceramic tile. Connected to the pit are trenches 36 that collect any liquid spills in the absorber area and funnel the liquid to the sump. The single absorber area sump 13 serves multiple purposes. First, the sump 13 is used to mix the reagent with recycle slurry from the reaction tank 7. A constant feed rate of recycle slurry is drained into the sump from the reaction tank (no pump required) and mixed with reagent. The feed rate of reagent is controlled by the reaction tank pH. The reagent is returned to the reaction tank with sump pumps. Second, the sump collects any water or slurry collected in the trench system surrounding the absorber area. This unique design allows reagent feed and storage equipment to be minimized or eliminated. It also is possible to use the sump as the limestone feed tank.

Slurry from the reaction tank 7 is bled directly to a hydrocyclone system 38 at dewatering station 14 from the slurry recycle header without the use of bleed pumps. The hydrocyclone overflow is sent into the reaction tank 7 directly without the use of pumps or an intermediary storage vessel. The hydrocyclone underflow is directed to a single belt filer 40. The belt filter 40 solids content may be adjusted to avoid any blowdown stream of fines and/or chlorides. The close coupling of the hydrocyclones, belt filter and recycle headers makes it possible to accomplish the dewatering step without any tanks, agitators, and pumps. The belt filter 40 vacuum system returns the reclaim water 42 directly to the reaction tank 7. If the system operator uses a waste pond to store and/or dewater by-product, the dewatering equipment can be eliminated entirely.

The entire system 15 is closed coupled with only one process island 16 encompassing all process equipment. The structural steel 31 (FIG. 9) used for the support of the inlet duct, the reagent silo 12, and the dewatering station 14, is an integral part of the structural support of the absorber vessel. The structural steel 31 for the absorber is designed to also accommodate structure to enclose equipment if needed in colder climates (e.g., slurry pumps, oxidation air compressors, vacuum pumps, filtrate tank and pumps, etc.). A spreader footer may be used as a low cost foundation as the height and the aspect ratio (low profile) support such a design. No process tanks (and associated foundations, pumps, agitators, control and electrical systems) are required. The structural steel as well as the absorber uses a modular design allowing for reduced construction duration and cost.

While the present invention has been particularly set forth in terms of specific embodiments thereof, it will be understood in view of the present disclosure, that numerous variations on the invention are now enabled to those skilled in the art, which variations yet reside within the scope of the present teaching. For example, while the system described above is designed to efficiently remove sulfur dioxide, halogens, and oxidized mercury, the design will also efficiently remove selenium as well as particulates and arsenic. Accordingly, the invention is to be broadly construed, and limited only by the scope and spirit of the disclosure and of the claims now appended hereto.

The invention claimed is:

1. A flue gas desulfurization (FGD) system for retrofitting on an existing coal-fired boiler, for scrubbing the raw flue gas generated by said boiler; comprising:
   (a) an inlet means connected for receiving from said boiler the raw flue gas to be scrubbed;
   (b) an outlet means connected to receive scrubbed flue gas and direct it for discharge;
   (c) an absorber connected between said inlet and outlet means for receiving the flue gas from said inlet means and removing $SO_2$ for subsequent discharge;
   (d) said absorber including a horizontal cocurrent scrubber section for contacting the flue gas with scrubbing reagents contained in a droplet dispersed slurry or solution;
   (e) means for cocurrently flowing said flue gas and droplet dispersed reagent slurry or liquid through said absorber while generating a pressure rise across said absorber;
   (f) said absorber including a spray zone for introducing said droplet dispersed slurry of scrubbing reagents;
   (g) said spray zone including cocurrent spray nozzles at said spray zone and one or more spray headers for delivering said slurry to said nozzles, for injecting said slurry at a higher velocity of flow than the bulk flow velocity at said zone of said flue gas, thereby contributing to the said pressure rise across said absorber; and
   (h) wherein said absorber includes a quench header upstream of the spray zone to wash the spray header in proximity to the quench header, to avoid solids buildup at wet-dry interfaces located on the said spray header and the inlet means.

2. A system in accordance with claim 1, wherein said spray nozzles provide a conical spray, the nozzles being oriented so that the axis of the cone is approximately parallel to the flue gas flow.

3. A system in accordance with claim 2, wherein said spray nozzles have a spray angle of from 40° to 120°.

4. A system in accordance with claim 2, wherein the droplet exit velocity from the spray nozzles is at least 15 feet per second.

5. A system in accordance with claim 4, wherein the droplet exit velocity from the spray nozzles is from 15 to 45 feet per second.

6. A system in accordance with claim 2, wherein the operating pressure to said nozzle is at least 10 psig.

7. A system in accordance with claim 3, wherein the operating pressure to said spray nozzles is from 10 to 45 psig.

8. A system in accordance with claim 7, wherein the operating pressure to said spray nozzles is about 25 psig.

9. A system in accordance with claim 2, wherein said spray nozzles provide full cone or hollow cone spray patterns.

10. A system in accordance with claim 2, wherein said absorber section includes a reaction tank for collecting the sprayed reagent slurry having contacted the flue gas; said reaction tank including means for introducing oxidation air into the collected slurry.

11. A system in accordance with claim 10, wherein said means for introducing oxidation air comprises one or more spargers positioned in said reaction tank, which additionally provide agitation in said tank.

12. A system in accordance with claim 11, further including one or more flow straightening devices at said inlet means to reduce gas recirculation and associated pressure drop in the flue gas flow.

13. A system in accordance with claim 12, wherein said flow straightening devices comprise turner vanes.

14. A system in accordance with claim 11, further including a bulk entrainment separator at said absorber downstream of said spray zone, to improve system performance by reducing slurry loading and improving gas velocity profile and increasing $SO_2$ removal.

15. A system in accordance with claim 14, wherein said bulk entrainment separator comprises a roughing mist eliminator.

16. A system in accordance with claim 15, wherein said absorber includes a mist eliminator downstream of said roughing mist eliminator, entrained droplets in flue gas from said bulk entrainment separator being further removed in said mist eliminator to eliminate carryover prior to said flue gas exiting to said absorber outlet duct.

17. A system in accordance with claim 16, wherein the entire said system is close coupled with only one process island encompassing all process equipment.

18. A system in accordance with claim 1, further including a silo for holding a dry or liquid/slurry reagent for feeding to said reaction tank.

19. A system in accordance with claim 18, further including a sump connected to receive reagent from said silo, said sump being connected to said reaction tank to receive recycle flow from said tank for mixing with said reagent and feeding the mix back to said reaction tank.

20. A system in accordance with claim 1, using no process tanks for reclaim water, filter feed slurry and mist eliminator wash water or for associated agitators, pumps, control systems and foundations.

21. A system in accordance with claim 1, including a dewatering station for receiving and dewatering slurry from said reaction tank.

22. A system in accordance with claim 21, wherein said dewatering station comprises a hydrocyclone and belt filter combination close coupled to the absorber; said station being connected to return the filtrate water directly to said reaction tank without the use of a filtrate tank, associated pumps, agitators, or controls.

23. A system in accordance with claim 22, wherein the entire said system is close coupled with only one process island encompassing all process equipment.

24. A system in accordance with claim 23, wherein said absorber comprises a vessel; wherein structural steel supports said absorber vessel, said inlet duct, said reagent silo, and the said dewatering station; and wherein said structural steel is an integral part of the structural support of the said absorber vessel.

* * * * *